Sept. 22, 1959     H. H. DEIST     2,905,430
CONTROL DEVICE FOR VEHICLE PNEUMATIC SUSPENSION SYSTEMS
Filed March 16, 1956
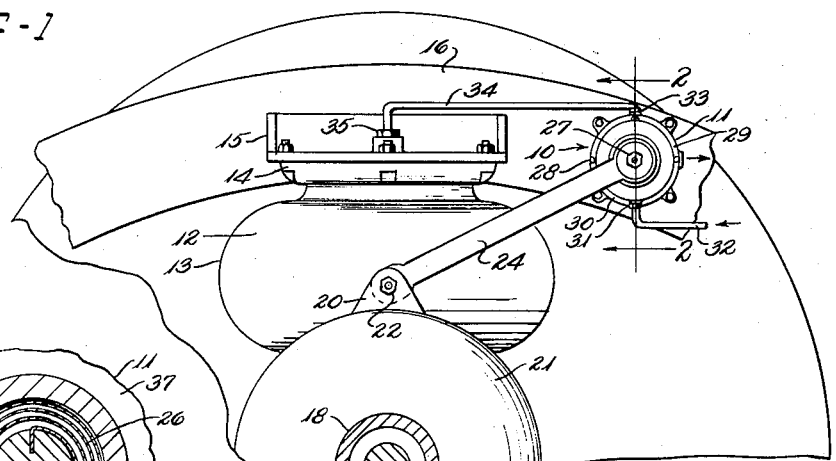
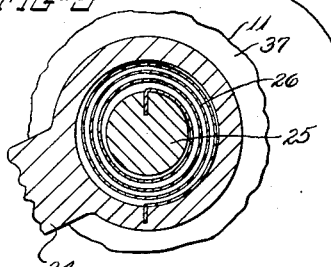
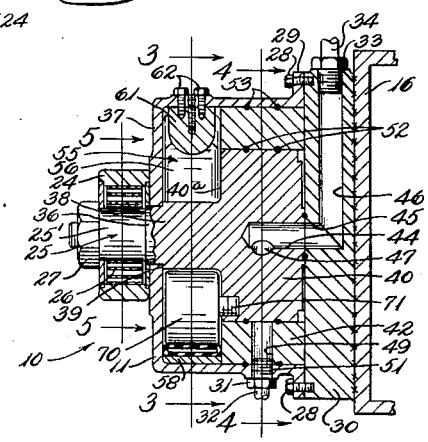
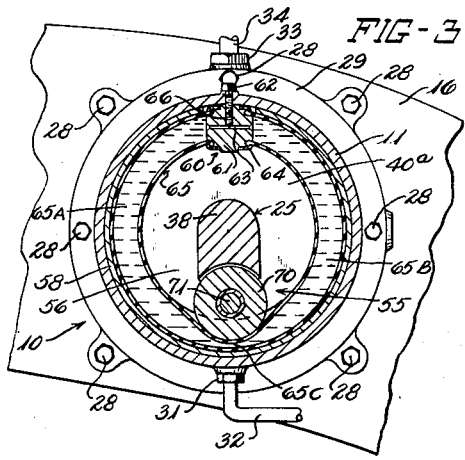
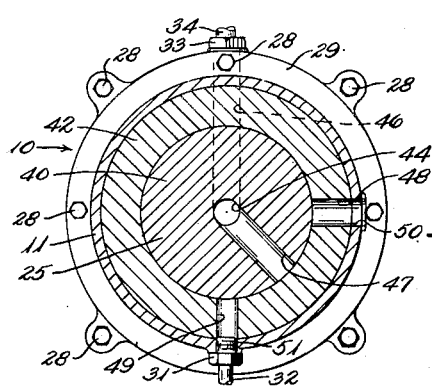
INVENTOR.
HERBERT H. DEIST
BY W. A. Fraser
ATTY.

United States Patent Office 2,905,430
Patented Sept. 22, 1959

2,905,430

CONTROL DEVICE FOR VEHICLE PNEUMATIC SUSPENSION SYSTEMS

Herbert H. Deist, Akron, Ohio, assignor to The Firestone Tire & Rubber Company, Akron, Ohio, a corporation of Ohio Application March 16, 1956, Serial No. 571,958

5 Claims. (Cl. 251—54)

This invention relates generally to suspension systems for vehicles. More particularly, the invention relates to pneumatic suspension systems and provides means whereby pneumatic devices, such as bellows type air springs, may be made to respond to increased or decreased vehicle loads causing a substantial change in the riding level of the vehicle, and yet prevent unnecessary alteration of the riding level when the vehicle road gear passes over a bump or drops into a hole, which actions only momentarily alter the load on the suspension system.

Pneumatic suspension systems, incorporating air springs interposed between the vehicle frame and road or running gear, have been slow to achieve commercial success because they have not been provided with satisfactory valve means for controlling and regulating the air cushion within the air springs. Maintaining a constant average air spring length or air cushion under variable static load conditions, will provide a constant riding level for the vehicle.

A satisfactory valve means for effectively controlling the riding level of a vehicle having an air spring suspension, must be responsive to changing static load conditions. An increase in the load will compress the air spring. To restore the air spring to its initial position, air under increased pressure must be admitted into the air spring. A decrease in load will cause the air spring to extend or rise, and therefore, air must be exhausted or vented from within the air spring to restore it to its initial position.

In addition to controlling the supply and exhaust of air to and from an air spring, a satisfactory valve control means must embody therein an adjustable time delay so that momentary alteration of the static load on the suspension system, such as would be encountered during normal axle movement due to road irregularities, will not cause the valve to supply or exhaust air. This time delay feature is often referred to as "damping" and preferably is adjustable over a time range of from 1 to 20 seconds, as determined by the weight of the vehicle, road conditions, etc.

The operation of the valve means also must not be influenced by the natural frequency of the vehicle suspension system which will probably be in the range of from 1 to 2 cycles per second.

Lastly, a satisfactory valve and its control means must be unaffected by and remain operative under extremes of temperature, humidity and exposure to sand, dirt, grease, oil and water.

It is therefore an object of this invention to provide an improved pneumatic suspension system for vehicles, which system includes improved valve and valve control means for controlling and regulating air springs interposed between the vehicle frame and road gear, so as to furnish a constant riding level for the vehicles and a constant average air spring length.

Another object is to provide an improved valve and control means for control and regulation of a vehicle air spring suspension, which controls the supply and exhaust of air to the air springs, has a novel time delay or "damping" feature, and is operative under extremes of temperature, humidity and other environmental conditions.

A further object is to provide an improved valve and control means located remotely of the air springs and embodying therein a novel adjustable time delay or damping component to prevent excessive operation of the valve, which is accurately responsive to persistent changes in vehicle loading, and which is of simple, relatively uncomplex construction.

A further object is to provide a novel time delay or damping mechanism, incorporating a cam means engaging a liquid filled distensible member, for use with an air spring control valve.

These and other objects will be apparent in view of the following detailed description of the invention considered with the attached drawings:

In the drawings:

Fig. 1 is a vertical sectional view through a vehicle axle showing in elevation a portion of the vehicle equipped with a pneumatic suspension system according to the invention;

Fig. 2 is an enlarged sectional view through the valve and control means taken substantially on line 2—2 of Fig. 1;

Fig. 3 is a sectional view taken substantially on line 3—3 of Fig. 2;

Fig. 4 is a view, similar to Fig. 3, taken substantially on line 4—4 of Fig. 2;

Fig. 5 is an enlarged fragmentary view taken substantialy on line 5—5 of Fig. 2; and, Fig. 6 is another enlarged fragmentary view showing a poriton of the time delay or damping means.

In the present invention a ride control valve means, indicated generally by the numeral 10, includes a housing 11, generally cylindrical in cross section, which carries a damping means, and an air supply and exhaust control means. The housing 11 is located remotely and laterally of a conventional air spring bellows 12, of multi-ply rubber and cord construction and having one or more convolutions 13. The upper end of the air spring is hermetically fastened by a suitable clamp ring 14 to the underside of a horizontal transverse member 15 constituting a portion of the vehicle frame. The member 15 is securely affixed at either end to longitudinal frame members 16. The lower end of the air spring 12 is also hermetically fastened by a similar clamp ring (not shown) to the axle housing 18 of the vehicle road gear. One mode of interposing an air spring between a vehicle frame and road gear has been shown and described. It will be understood, however, that the principles of the invention are applicable to air springs interposed in other ways between the frame and road gear. Also, only one air spring has been shown in connection with this invention, but it will be understood that the invention may be utilized with as many air springs as are required on a vehicle.

A stub flange 20, which may be located atop the vehicle differential housing 21, has a bolt 22 therethrough. The bolt 22 extends through the lower end of a control valve actuating rod 24. As best shown in Fig. 5, the upper end of the actuating rod 24 is connected to a control device actuating member, indicated generally by the numeral 25, by a coiled flat spring 26. The spring 26 is secured by a nut 27 threaded onto the outer end 25' of the member 25, and permits relative sliding movement of the rod 24 in relation to the member 25.

The housing 11 preferably is located above and to the rear of the horizontal plane of the axle, and is fastened by a plurality of small bolts 28, extending through a generally cylindrical mounting flange 29, to a control device housing end plate 30. The housing end plate is secured, preferably by welding, to one of the longitudinal frame members 16.

Air, from a source under pressure (not shown) is supplied to the control device 10 through an air supply fitting 31 on the underside of the housing 11 (see Fig. 4). The fitting 31 is connected to the air source by suitable piping 32 having a conventional check valve (not shown) therein so that air cannot back out. The end plate 30 of the control device has a similar bellows fitting 33 therein which is connected by suitable piping 34 to an air spring fitting 35, which extends through the frame member 15 into the interior of the air spring. The piping 34 is the conduit for supplying air to and exhausting air from the air spring 12, through the control device 10, as referred to later.

Referring to Fig. 2, the valve actuating member 25, inwardly of the outer end 25', has a slightly enlarged body portion 36 which is journaled in the end wall 37 of the housing 11. Inwardly of portion 36, a further enlarged portion 38 provides a shoulder 39, bearing against the inner surface of the end wall 37. The innermost section of the member 25 is a port body portion 40, which is generally cylindrical and is journaled so as to freely rotate within an annular port ring 42. The port ring 42 is tightly fitted within the housing 11 and normally abuts the end plate 30.

Referring also to Fig. 4, within the port body 40 of the member 25 and extending axially thereof toward the end plate 30 is a passage 44. The passage 44 is at all times in communication with a short lateral passage 45 in the end plate. The passage 45 communicates with a vertical passage 46, also in the end plate, into the upper end of which is inserted the bellows fitting 33, previously described.

As best shown in Fig. 4, the passage 44 also communicates with a passage 47 extending radially to the outer edge of port body 40 of the member 25. As described in detail below, the passage 47 is intended to selectively communicate with an air exhaust or vent passage 48, or, an air supply passage 49, both extending radially through the port ring 42 at approximately right angles to one another. The air exhaust passage 48 is at all times in communication with an air exhaust port 50 in a sidewall of the housing 11. The air supply passage 49 is at all times in communication with an air supply port 51 in the housing 11, into the lower end of which is inserted the supply fitting 31.

Elements 44–51, just described define the conduits interiorly of the control valve, through which air passes from the air supply fitting 31, to the bellows fitting 33, and from the latter fitting to the exhaust port 50. Such passage of air is controlled by the position of the valve actuating member 25, within the housing 11 and in relation to the port ring 30. Such rotation of the member 25 is in turn caused by the actuating rod 24. Suitable O-ring seals, such as at 52, between the port body 40 of member 25 and the port ring 42, and as at 53 between the port ring and the housing 11, are provided to prevent loss of air during such rotation.

The rotation or movement of the member 25 within the housing 11 is "damped" or retarded by a damping means, indicated generally by the numeral 55; and, located in the area 56 within the housing 11, such area 56 being between the housing end wall 37 and the outer face 40a of the member 25.

The damping means 55 includes a compression ring 58, which is a relatively thin annular metal band spaced between the end wall 37 and the port body 40 and fitted around the inner surface of the housing 11 except for a short removed section at the top, indicated at 59. As best shown in Fig. 6, attached to the top of the housing 11 between the interrupted ends 59 is an orifice and tube clamping member, indicated generally by the numeral 60.

Referring to Figs. 2 and 6, the body 61 of the member 60 is attached to the housing 11 by suitable screws 62.

Extending horizontally through the body 61 is a restricted or small diameter orifice 63. At either end of the body 61 are identical tube clamps 64, threaded on the body so as to hermetically seal the free ends of an annular tube 65.

The tube 65, which may be of any impermeable and distensible material which is strong and resistant to hydraulic fluids, is spaced adjacent the ring 58 within the area 56 and is completely filled with a suitable liquid, such as hydraulic brake fluid, which fluid also fills the orifice 63 so as to form a hermetically sealed liquid system. Provision is made by filling the tube 65 with fluid by a tapped hole 66, communicating from the exterior of the housing 11 with the orifice 63, and normally sealed by a screw 67.

Referring to Figs. 2 and 3, affixed to the face 40a of member 25, within the tube 65 and in deformable contact therewith, is an eccentric or lever means preferably in the form of a freely rotating roller 70, for partially compressing the tube 65 against the ring 58 so as to form two variable volume fluid chambers, 65A and 65B, connected by a reduced area portion 65C. The roller is attached to the face 40a of member 25 by a suitable bolt 71, and is thus responsive to all movement or rotation imparted to the member 25 by the rod 24.

The operation of the control device 10 is as follows:

Assume that the normal static load on the vehicle suspension requires the air springs to be inflated to a pressure of about 50 p.s.i. In this condition the port body 40 is in the position shown in Fig. 4, that is, neither the vent passage 48 nor the supply passage 49 is in communication with the radial passage 47. Thus, air can neither be exhausted from or supplied to the air spring 12 and the pressure therein is maintained constant.

Now then, assume that the static load is increased, for example, by adding merchandise or passengers to the vehicle. As the load is increased, the upper frame members 15 and 16 move downwardly toward the axle housing 18, causing the air spring 12 to contract. During this downward movement of the upper frame members, the end plate 30 and control device 10 also move downwardly. Such downward movement of the control device 10 causes the actuating member 25 to be turned by the actuating rod 24, the upper end of which is attached to the end 25' by the spring 26 so as to permit relative sliding movement of the rod as the device 10 moves downwardly. That is, as the distance between the member 15 and the axle housing 18 decreases, the rod 24 will cause the member 25 to be rotated within the housing 11.

As viewed in Fig. 3, an increased load will cause the member 25 to rotate in a clockwise direction to supply air under pressure into the air spring 12. As the member 25 is rotated clockwise on its axis, the roller 70 will tend to reduce the area of fluid chamber 65A. However, resistance to this reduction of chamber 65A, and the corresponding increase in the area of chamber 65B, is afforded by the connecting area 65C and the restricted passage of orifice 63. Thus, the rate at which fluid will be displaced from chamber 65A to 65B, which is also the rate of rotation of member 25, will be determined by the size of area 65C and orifice 63. It will be noted that, while the position of area 65C is continually changing as a result of rotation of the member 25, the cross-sectional area thereof as defined by the roller 70 and compression ring 58, remains substantially constant. It will also be noted, that the spring 26 will momentarily store torque supplied by the rod 24, in the event that the extent of contraction of the air spring 12 exceeds the rate at which the member 25 is being rotated. This form of "lost motion" is extremely advantageous and is discussed more fully below.

When the member 25 has been rotated a distance sufficient to cause the radial passage 47 in the port body to become in communication with the air supply passage 49, additional air will begin to flow from the supply piping 32, through the fitting 31, into passages 49, 47, 44, 45 and 46, and thence through fitting 33 and piping 34, to the air spring 12. As the member 25 continues to rotate further in a clockwise direction, passages 47 and 49 will become more nearly concentric and still more additional air will pass through the device 10 to the air spring 12. The additional air must be under a greater pressure than the air already in the spring 12, and will extend the air spring to its initial position.

As the air spring extends, the upper frame members 15 and 16 move upwardly from the axle housing 18, causing the actuating member 25 to be turned by the actuating rod 24 in a counter-clockwise direction as viewed in Fig. 3. As the member 25 begins to assume the normal position shown in Fig. 4, the roller 70 will begin to reduce the area of fluid chamber 65B, with the displaced fluid returning to chamber 65A. As the member 25 continues to rotate, the radial passage 47 will no longer be in communication with the supply passage 49 and the flow of additional air to the air spring 12 will cease.

If the static load on the vehicle suspension is decreased, the frame members 15 and 16 move upwardly away from the axle housing 18, causing the air spring to extend. During this upward movement of the frame members, the control device 10 also moves upwardly. Such upward movement of the control device causes the actuating member 25 to be rotated by the actuating rod 24, in the counter-clockwise direction as viewed in Fig. 3, the presence of spring 26 permitting the rod 24 to slide relative to the end 25' as the device 10 moves upwardly.

As viewed in Fig. 3, a decreased load will cause the member 25 to rotate in a counter-clockwise direction to exhaust air from within the air spring 12. As the member 25 is rotated counter-clockwise on its axis, the roller 70 will tend to reduce the area of fluid chamber 65B. As described above, resistance to this reduction of chamber 65B is afforded by the connecting area 65C and the restricted passage of orifice 63.

As the fluid is transferred to chamber 65A from chamber 65B, the radial passage 47 in the body port 40 will become in communication with the air exhaust passage 48, permitting exhaust air to flow from the air spring 12, through the piping 34 and fitting 33, the passages 46, 45, 44, 47 and 48, and out the exhaust port 50 to the atmosphere.

As the air spring contracts, the upper frame members 15 and 16 move downwardly toward the axle housing 18 causing the actuating member 25 to be rotated by the actuating rod 24 in a clockwise direction as vieweded in Fig. 3. As the member 25 begins to assume the normal position shown in Fig. 4, the roller 70 will reverse in direction of rotation, and begin to reduce the area of fluid chamber 65A, with the displaced fluid returning to chamber 65B. As the member 25 continues to rotate, the radial passage 47 will no longer be in communication with the exhaust passage 50 and the exhaust of air from within the air spring 12 will cease.

When a vehicle equipped with a suspension system according to the invention is driven over rough roads with no change in static loading, the vehicle wheels will move up and down over bumps and into holes in the road. However, the valve actuating member cannot readily move because of the time delay effect of the damping means 55. Moreover, the lost motion provided by the spring 26 also serves to absorb high impact torques of momentary duration. Thus, the admission of additional air to or exhaust of air from the air spring 12 will not occur until a force is maintained in one direction for a predetermined period of time which can be controlled by the cross-sectional areas of the area 65C and the orifice 63. It will be found desirable to choose such cross-sectional areas as will provide a time lag of about 7 seconds before the radial passage 47 in the port body 40 will be rotated into communication with either the supply passage 49 or the exhaust passage 48. However, the time delay may be selected at any place within the preferred range of from 1 to 20 seconds.

While a preferred embodiment of the invention has been shown and described, it will be understood that changes and modifications may be made therein without departing from the spirit of the invention or the scope of the subjoined claims.

What is claimed is:

1. In a control valve having a body rotatable within a housing, a damping means including a fluid filled distensible annular member having a restricted passage therein providing resistance to the flow of fluid in said member and mounted in concentric relation with the axis of rotation of said body in contact with said housing, and an eccentric means attached to said rotatable body within the space enclosed by said annular member and in deforming contact therewith.

2. In a control valve having a body rotatable within a housing, a damping means including a liquid filled distensible annular tube mounted in concentric relation with the axis of rotation of said body, a clamp attached to said housing having a small diameter liquid passage therethrough and provided with means to secure the ends of said tube in communication with the opposite ends of said passage so as to form a hermetically sealed liquid system, and a roller rotatably attached to said body, offset from the axis of rotation thereof, within the space enclosed by said annular tube and in deforming contact therewith.

3. A device for controlling the passage of a fluid under pressure, comprising, a housing open at one end, a plate closing said end, an annular port ring within said housing abutting said plate, a rotatable ported member having a body portion movable within said port ring, the port of said member adapted to move into and out of register with the ring port upon rotation of said member, a fluid filled distensible annular tube having a restricted passage therein to restrict flow of fluid within said tube and mounted in concentric relation with the axis of rotation of said member adjacent said port ring, and eccentric means attached to the body portion of said member within the space enclosed by said tube and in deforming contact therewith.

4. A device for controlling the passage of a fluid under pressure, comprising, a housing open at one end and having a cylindrical bore, a plate closing said open end, an annular port ring fitted within said bore abutting said plate, a rotatable ported member having a body portion movable within said ring, the port of said member being adapted to move into and out of registry with the ring port upon rotation of said member, a liquid filled distensible annular tube within said housing bore and mounted in concentric relation with the axis of rotation of said member, a clamp within said bore having a small diameter liquid passage therethrough and provided with means to secure the ends of said tube in communication with the opposite ends of said passage so as to form a sealed liquid system with the said small passage restricting flow of liquid within the tube, and a roller attached to the body portion of said member within the space enclosed by said tube and in deforming contact therewith.

5. Control means adapted for regulation of the supply and exhaust of air to and from an expansible bellows for a vehicle suspension system to maintain a predetermined height between the road gear and frame of the vehicle, comprising, a housing having a cylindrical bore and three conduits therethrough for the passage of air, an annular ring fitted within said housing abutting one end of said bore and having ports communicating with two of said housing conduits, a rotatable member having a body portion movable within said ring and a shaft extending exteriorly of the other end of said bore, said body portion having an axial conduit in continuous communication with one of said housing conduits and a radial conduit communicating with said axial conduit and adapted for selective communication with said ring ports, lever means attached to said shaft and adapted for rotation thereof; a liquid filled distensible annular tube within said housing bore mounted in concentric relation with the axis of rotation of said member, a clamp within said bore having a small diameter liquid passage therethrough and provided with means to secure the ends of said tube in communication with the opposite ends of said passage so as to form a sealed liquid system with the said small passage restricting flow of liquid within the tube, and a roller attached to the body portion of said member within the space enclosed by said tube and in deforming contact therewith.

References Cited in the file of this patent

UNITED STATES PATENTS

| | | |
|---|---|---|
| 513,315 | Funk | Jan. 23, 1894 |
| 749,910 | Walter | Jan. 19, 1904 |
| 963,470 | Du Pont | July 5, 1910 |
| 967,465 | Trautschold | Aug. 16, 1910 |
| 1,151,326 | Anderson | Aug. 24, 1915 |
| 1,228,469 | Mueller | June 5, 1917 |
| 2,065,167 | Wirth | Dec. 22, 1936 |
| 2,158,624 | Gregory | May 16, 1939 |
| 2,466,327 | Rieber | Apr. 5, 1949 |
| 2,670,201 | Rossman | Feb. 23, 1954 |